(12) United States Patent
Hwang et al.

(10) Patent No.: US 10,133,116 B2
(45) Date of Patent: Nov. 20, 2018

(54) LIQUID CRYSTAL DISPLAY DEVICE

(71) Applicant: Samsung Display Co., Ltd., Yongin-si (KR)

(72) Inventors: Jonghak Hwang, Yongin-si (KR); Joonggun Chong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/350,347

(22) Filed: Nov. 14, 2016

(65) Prior Publication Data

US 2017/0219877 A1  Aug. 3, 2017

(30) Foreign Application Priority Data

Feb. 3, 2016  (KR) .................. 10-2016-0013532

(51) Int. Cl.
 *G02F 1/1335*  (2006.01)
 *G02F 1/1333*  (2006.01)
 (Continued)

(52) U.S. Cl.
 CPC ...... *G02F 1/133514* (2013.01); *G02F 1/1368* (2013.01); *G02F 1/133345* (2013.01); *G02F 1/133512* (2013.01); *G02F 1/134309* (2013.01); *G02F 1/136286* (2013.01); *G02F 2201/123* (2013.01)

(58) Field of Classification Search
 CPC ......... G02F 1/133514; G02F 1/134309; G02F 1/133345; G02F 1/136286; G02F 1/1368; G02F 1/133512; G02F 2201/123
 See application file for complete search history.

(56) References Cited

U.S. PATENT DOCUMENTS 5,910,829 A * 6/1999 Shimada ........... G02F 1/133512
   349/106
5,994,721 A * 11/1999 Zhong ............... G02F 1/136213
   257/440

(Continued)

FOREIGN PATENT DOCUMENTS

KR  10-2005-0112020  11/2005
KR  10-2006-0027010  3/2006
(Continued)

*Primary Examiner* — Donald Raleigh
(74) *Attorney, Agent, or Firm* — H.C. Park Associates, PLC

(57) ABSTRACT

A liquid crystal display device includes a first display substrate, a second display substrate, and a liquid crystal layer disposed between the first and second display substrates. The first display substrate further includes a first pixel electrode and a second pixel electrode, a first color filter and a second color filter disposed below and overlapping the first pixel electrode and the second pixel electrode, respectively, a first thin film transistor, and a contact portion connecting the first thin film transistor to the first pixel electrode. The first color filter and the second color filter contact each other, and one of the first color filter and the second color filter includes an indented portion partially surrounding the contact portion. A portion of the one of the first color filter and the second color filter is spaced apart from a portion of the other with the contact portion disposed therebetween.

20 Claims, 14 Drawing Sheets

(51) Int. Cl.
　　　*G02F 1/1343*　　　(2006.01)
　　　*G02F 1/1362*　　　(2006.01)
　　　*G02F 1/1368*　　　(2006.01)

(56) References Cited

U.S. PATENT DOCUMENTS

| | | | | |
|---|---|---|---|---|
| 6,031,512 | A * | 2/2000 | Kadota | G02F 1/133516 |
| | | | | 345/88 |
| 8,493,523 | B2 * | 7/2013 | Kim | G02F 1/133707 |
| | | | | 349/139 |
| 2005/0270445 | A1 | 12/2005 | Lee et al. | |
| 2014/0049717 | A1 | 2/2014 | Kwak et al. | |
| 2015/0102356 | A1 * | 4/2015 | Mizuno | G02F 1/136227 |
| | | | | 257/72 |
| 2015/0348481 | A1 | 12/2015 | Hong et al. | |
| 2016/0062201 | A1 | 3/2016 | Lim et al. | |
| 2016/0133176 | A1 | 5/2016 | Oh et al. | |
| 2016/0216578 | A1 | 7/2016 | Lee et al. | |
| 2017/0255070 | A1 * | 9/2017 | Hao | G02F 1/136209 |
| 2017/0285410 | A1 * | 10/2017 | Kobayashi | G02F 1/133707 |

FOREIGN PATENT DOCUMENTS

| | | |
|---|---|---|
| KR | 10-2010-0129666 | 12/2010 |
| KR | 10-2014-0023710 | 2/2014 |
| KR | 10-2015-0139132 | 12/2015 |
| KR | 10-2016-0025146 | 3/2016 |
| KR | 10-2016-0055620 | 5/2016 |
| KR | 10-2016-0092116 | 8/2016 |

* cited by examiner

LIQUID CRYSTAL DISPLAY DEVICE

CROSS-REFERENCE TO RELATED APPLICATION

This application claims priority from and the benefit of Korean Patent Application No. 10-2016-0013532, filed on Feb. 3, 2016, which is hereby incorporated by reference for all purposes as if fully set forth herein.

BACKGROUND

Field

Exemplary embodiments of the inventive concepts generally relate to liquid crystal display (LCD) devices having a color filter layer formed separately from the thin film substrate layer, and, more particularly, to LCD devices in which the separate color filter and thin film substrate layers may be more easily and reliably manufactured to minimize alignment issues and reduce formation of cell gaps causing disconnection of extension electrodes.

Discussion of the Background

Liquid crystal display devices have advantages such as low operating voltage and low power consumption and may be employed in portable devices. Thus, they are widely used in a variety of fields for notebook computers, monitors, spacecrafts, and airplanes, etc.

A liquid crystal display device includes a liquid crystal (LC) layer disposed between two substrates and displays an image by adjusting an arrangement state of the LC layer depending on whether an electric field is applied thereto, thereby adjusting transmittance of light.

Generally, since a thin film transistor is formed above a lower substrate from among the two substrates, the lower substrate may be referred to as a thin film transistor substrate. Since a color filter is formed above an upper substrate, the upper substrate may be referred to as a color filter substrate.

However, if the color filter substrate and the thin film transistor substrate are manufactured separately and attached to each other, the manufacturing process becomes complex and it is difficult to align the two substrates. Moreover, when the color filter is included in the thin film transistor substrate, cell gaps may not be maintained constant and electrodes extending from the pixels may become disconnected.

The above information disclosed in this Background section is only for enhancement of understanding of the context of the inventive concept, and, therefore, it may contain information that does not form the prior art that is already known in this country to a person of ordinary skill in the art.

SUMMARY

Exemplary embodiments overcome one or more of the above-noted drawbacks by providing a liquid crystal display device having a color filter disposed above a thin film transistor substrate that may be manufactured more simply and improve alignment of the layers. Moreover, exemplary embodiments include a layer structure that minimizes the likelihood of disconnection of a pixel electrode while maintaining a substantially constant cell gap.

An exemplary embodiment includes a liquid crystal display device. The liquid crystal display device includes a first display substrate including a gate line and a data line, a second display substrate facing the first display substrate, and a liquid crystal layer disposed between the first display substrate and the second display substrate. The first display substrate further includes a first pixel electrode and a second pixel electrode respectively corresponding to a first pixel area and a second pixel area and disposed adjacent to each other with one of the gate line and the data line disposed therebetween, a first color filter and a second color filter respectively disposed below and overlapping the first pixel electrode and the second pixel electrode, respectively, a first thin film transistor electrically connected to the first pixel electrode, and a contact portion connecting the first thin film transistor to the first pixel electrode. The first color filter and the second color filter contact each other, and one of the first color filter and the second color filter includes an indented portion partially surrounding the contact portion. A portion of the one of the first color filter and the second color filter is spaced apart from the other of the first color filter and the second color filter with the contact portion disposed therebetween.

The one of the first color filter and the second color filter may include a protruding portion adjacent to the indented portion and extending toward the other of the first color filter and the second color filter.

An end of the protruding portion may contact the other of the first color filter and the second color filter.

The other of the first color filter and the second color filter may include a first portion spaced apart from the indented portion with the contact portion disposed therebetween.

The first portion may extend toward the indented portion from an end of the other of the first color filter and the second color filter.

The first pixel electrode may include an electrode portion corresponding to the first pixel area, and an extension electrode portion extending toward the contact portion from the electrode portion and overlapping the first color filter.

The electrode portion may include a cutout pattern.

The contact portion may be disposed in a black area between the first pixel area and the second pixel area.

The second display substrate may include a black matrix corresponding to the black area.

The first color filter and the second color filter may have colors different from each other.

The first color filter and the second color filter may have shapes in the form of an island, corresponding to the first pixel region and the second pixel region, respectively.

Each of the first color filter and the second color filter may have an elongate shape extending along a direction of the one of the gate line and the data line.

The first color filter and the second color filter may have substantially the same shape.

The first display substrate may further include a third pixel electrode disposed adjacent to the second pixel electrode along a direction of the one of the gate line and the data line and disposed spaced apart from the first pixel electrode with the one of the gate line and the data line disposed therebetween and a thin film transistor electrically connected to the third pixel electrode.

The first thin film transistor and the thin film transistor may be electrically connected to the one of the gate line and the data line.

The first display substrate may further include a second thin film transistor connected to the second pixel electrode and electrically connected to a first line, which is disposed parallel to the one of the gate line and the data line and disposed spaced apart from the one of the gate line and the data line with the second pixel area disposed therebetween.

The thin film transistor may be electrically connected to a first line, which is disposed parallel to the one of the gate line and the data line and disposed spaced apart from the one of the gate line and the data line with the third pixel electrode disposed therebetween.

The first display substrate may further include a second thin film transistor connected to the second pixel electrode and electrically connected to the one of the gate line and the data line.

The first display substrate may further include a first passivation layer covering the first thin film transistor, and the first color filter and the second color filter are disposed above the first passivation layer.

The first display substrate may further include a second passivation layer covering the first color filter and the second color filter, and the first pixel electrode and the second pixel electrode are disposed above the second passivation layer.

Additional aspects of the inventive concepts are set forth in the following detailed description, and will be apparent, at least in part, from the disclosure, or may be learned by practice of the inventive concepts disclosed herein.

The foregoing general description and the following detailed description are exemplary and explanatory and are intended to provide further explanation of the claimed subject matter, which is defined solely by the appended claims.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
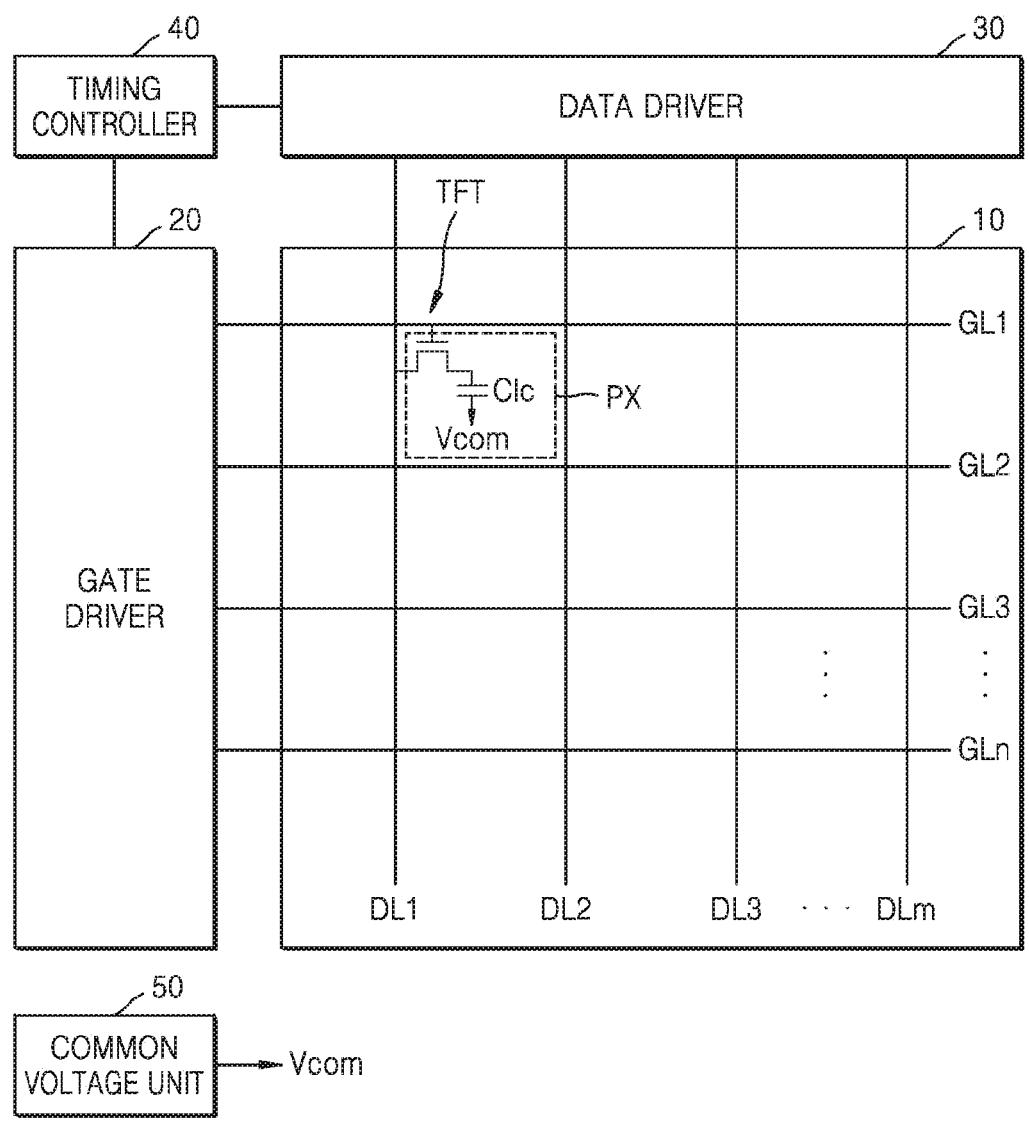
FIG. 1 is a conceptual block diagram of a liquid crystal display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a conceptual block diagram of a liquid crystal display device according to an exemplary embodiment.

Referring to FIG. 1, a liquid crystal display device may include a display 10, a gate driver 20, a data driver 30, a timing controller 40, and a common voltage unit 50. The liquid crystal display device is an active liquid crystal display device, and a thin film transistor TFT provided to each pixel PX may change light transmittance of a pixel PX by controlling a voltage level of the pixel PX.

The display 10 may include gate lines GL1 to GLn extending in a horizontal direction, data lines DL1 to DLm extending in a vertical direction and crossing the gate lines GL1 to GLn, and a plurality of pixels PX arranged in intersection regions of the gate lines GL1 to GLn with the data lines DL1 to DLm.

Each pixel PX may include a thin film transistor TFT connected to a gate line and a data line corresponding to each pixel PX, and a liquid crystal capacitor Clc connected to the thin film transistor TFT. One end of the Clc may be connected to the common voltage unit 50. Though not shown, each pixel PX may include a storage capacitor connected in parallel to the Clc.

The gate driver 20 may drive the gate lines GL1 to GLn in response to a control signal provided from a timing controller 40.

The data driver 30 may output grayscale voltages for driving data lines DL1 to DLm in response to an image data signal and a control signal provided from the timing controller 40.

The timing controller 40 may convert a plurality of image signals received from the outside the device into a plurality of image data signals and may transmit the image data signals to the data driver 30. The timing controller 40 may receive a synchronization signal and a clock signal and may generate a control signal for controlling the gate driver 20 and the data driver 30. The timing controller may transmit the control signal to the gate driver 20 and the data driver 30.

Figure 2:
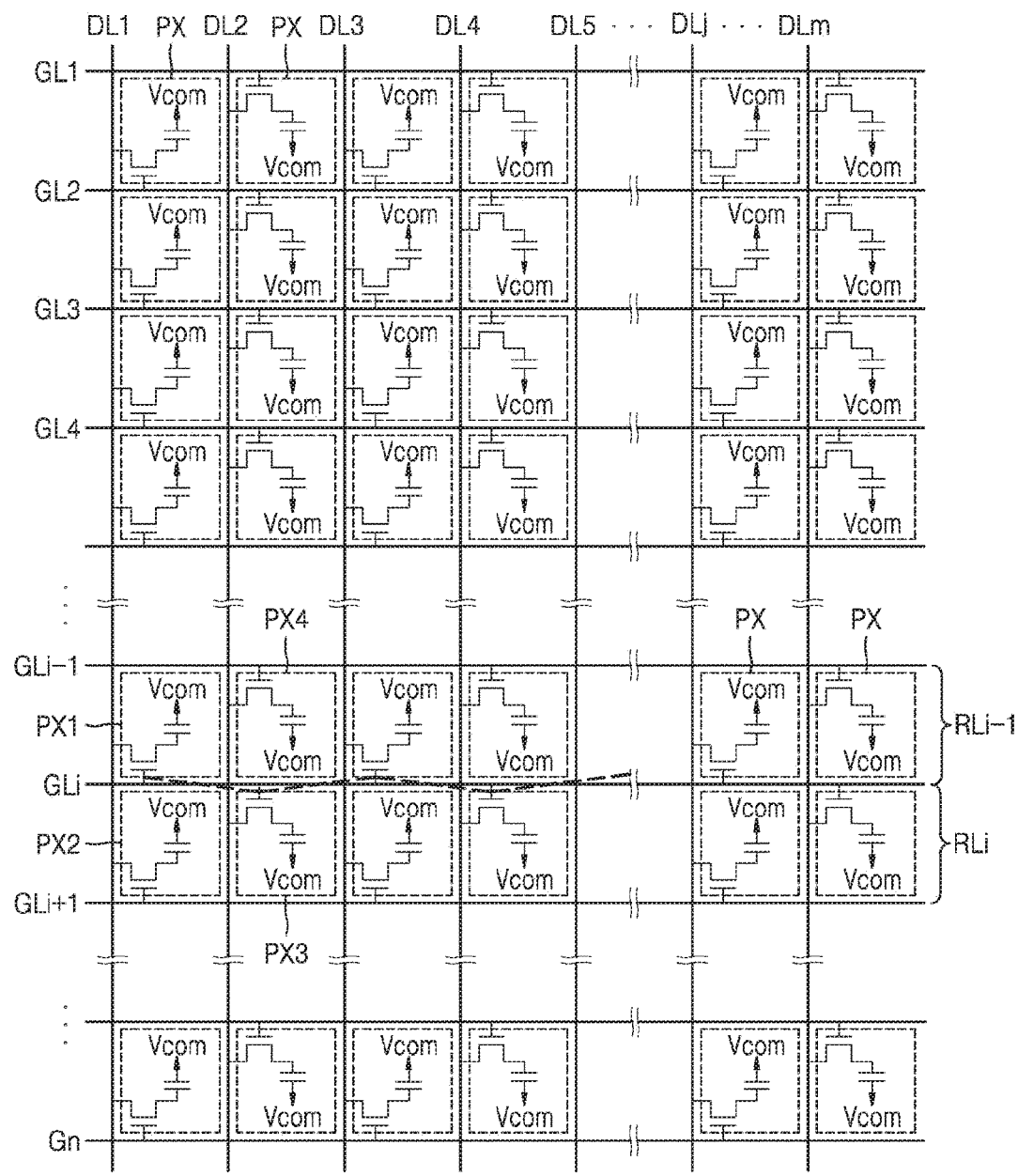
FIG. 2 is a schematic circuit diagram of a display of a liquid crystal display device according to an exemplary embodiment.

FIG. 2 is a schematic circuit diagram of a display of a liquid crystal display device according to an exemplary embodiment.

Referring to FIG. 2, pixels PX may be disposed in a matrix configuration. Pixels PX extending in a horizontal direction form a pixel row, and pixels PX extending in a vertical direction form a pixel column.

One gate line GLi (i=1, 2, 3, . . . , n) may be alternately connected to pixels PX in adjacent two pixel rows RLi−1 and RLi and may provide a gate signal. Pixels PX may be alternately disposed above and below a gate line GLi, for example, may be disposed zigzag.

Some pixels of pixels PX in an (i−1)-th pixel row RLi−1, for example, a first pixel PX1 may be electrically connected to an i-th gate line GLi, and the other pixels, for example, a fourth pixel PX4 may be electrically connected to an (i−1)-th gate line GLi−1.

A gate electrode of a thin film transistor of the first pixel PX1 may be connected to the i-th gate line GLi, and a source electrode of the thin film transistor of the first pixel PX1 may be connected to a first data line DL1. A drain electrode of the thin film transistor of the first pixel PX1 may be connected to a pixel electrode of the first pixel PX1. The thin film transistor of the first pixel PX1 may supply a data signal received from the first data line DL1 to the pixel electrode of the first pixel PX1 in response to a gate signal received from the i-th gate line GLi.

A gate electrode of a thin film transistor of the fourth pixel PX4 may be connected to the (i−1)-th gate line GLi−1, and a source electrode of the thin film transistor of the fourth pixel PX4 may be connected to a second data line DL2. A drain electrode of the thin film transistor of the fourth pixel PX4 may be connected to a pixel electrode of the fourth pixel PX4. The thin film transistor of the fourth pixel PX4 may supply a data signal received from the second data line DL2 to the pixel electrode of the fourth pixel PX4 in response to a gate signal received from the (i−1)-th gate line GLi−1.

Some pixels of pixels PX in an i-th pixel row RLi, for example, a second pixel PX2 may be electrically connected to an (i+1)-th gate line GLi+1, and the other pixels, for example, a third pixel PX3 may be electrically connected to the i-th gate line GLi.

A gate electrode of a thin film transistor of the second pixel PX2 may be connected to the (i+1)-th gate line GLi+1, and a source electrode of the thin film transistor of the second pixel PX2 may be connected to the first data line DL1. A drain electrode of the thin film transistor of the second pixel PX2 may be connected to a pixel electrode of the second pixel PX2. The thin film transistor of the second pixel PX2 may supply a data signal received from the first data line DL1 to the pixel electrode of the second pixel PX2 in response to a gate signal received from the (i+1)-th gate line GLi+1.

A gate electrode of a thin film transistor of the third pixel PX3 may be connected to the i-th gate line GLi, and a source electrode of the thin film transistor of the third pixel PX3 may be connected to the second data line DL2. A drain electrode may be connected to a pixel electrode of the third pixel PX3. The thin film transistor of the third pixel PX3 may supply a data signal received from the second data line DL2 to the pixel electrode of the third pixel PX3 in response to a gate signal received from the i-th gate line GLi.

The first pixel PX1, the second pixel PX2, the third pixel PX3, and the fourth pixel PX4 may be pixels of different colors. For example, the first pixel PX1 may be a red pixel, the second pixel PX2 may be a blue pixel, the third pixel PX3 may be a white pixel, and the fourth pixel PX4 may be a green pixel. According to an embodiment, the data lines DL1 to DLm may provide data signals in a sequence of column reversion such as (+), (+), (−), (−), (+), (+), (−), (−), or (+), (−), (+), (−), (+), (−), (+), (−).

As illustrated in FIG. 2, the first pixel PX1, the second pixel PX2, the third pixel PX3, and the fourth pixel PX4 having different colors may be disposed adjacent to one another to form one unit pixel. Pixels PX connected to the same gate line GLi may be alternately disposed, that is, disposed zigzag, and pixels PX having the same color may have the same polarity.

Figure 3:
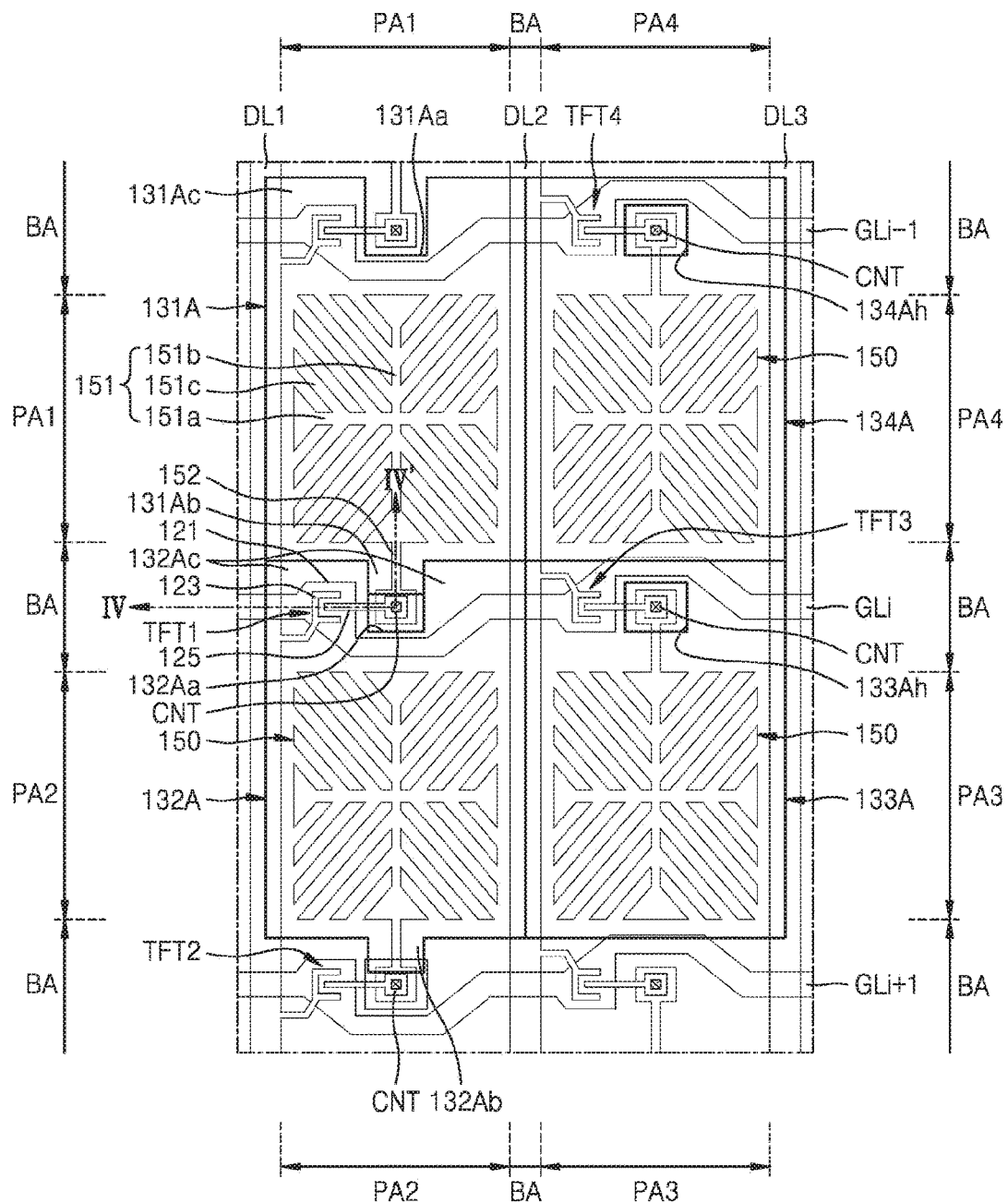
FIG. 3 is a plan view of a portion of a liquid crystal display device according to an exemplary embodiment.
Figure 4:
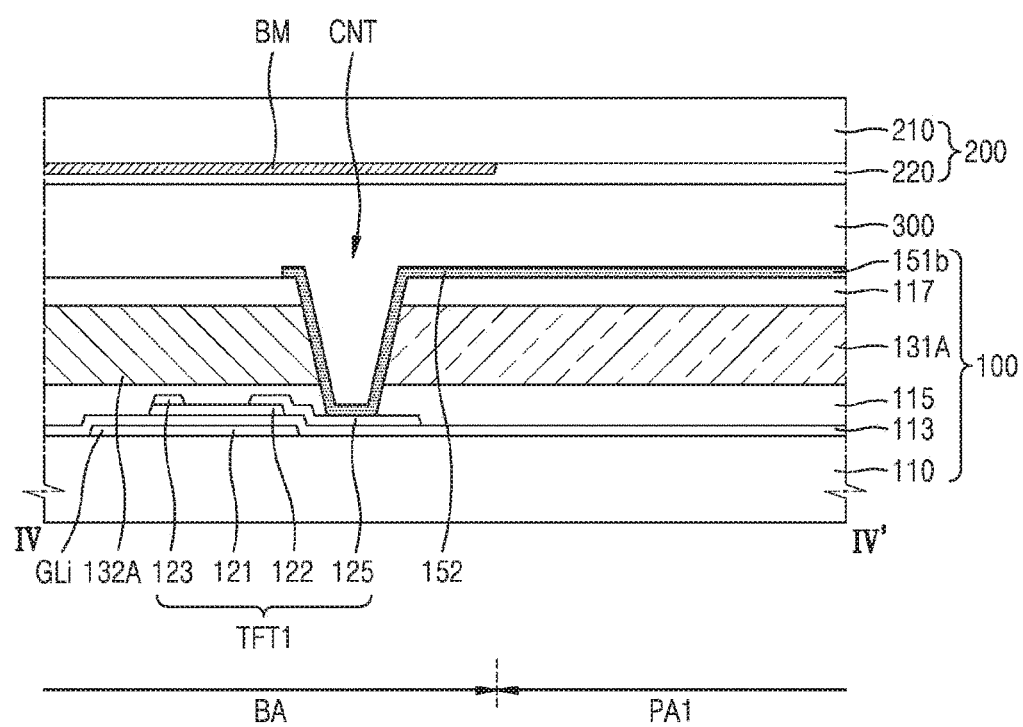
FIG. 4 is a cross-sectional view of the liquid crystal display device of FIG. 3 taken along sectional line IV-IV' of FIG. 3.

FIG. 3 is a plan view of a portion of a liquid crystal display device according to an exemplary embodiment. FIG. 4 is a cross-sectional view of the liquid crystal display device of FIG. 3 taken along sectional line IV-IV' of FIG. 3.

Referring to FIGS. 3 and 4, a liquid crystal display device may include a first display substrate 100, a second display substrate 200 facing the first display substrate 100, and a liquid crystal (LC) layer 300 disposed therebetween.

The first display substrate 100 may include a substrate 110 formed of a glass material or a plastic material. The substrate 110 may include gate lines GLi−1, GLi, and GLi+1, data lines DL1, DL2, and DL3, first, second, third, and fourth pixel areas PA1, PA2, PA3, and PA4, and a black (light absorbing) area BA disposed between the first, second, third, and fourth pixel areas PA1, PA2, PA3, and PA4.

Gate lines GLi−1, GLi, and GLi+1, and data lines DL1, DL2, and DL3 are disposed in the black area BA. A portion of each of the gate lines GLi−1, GLi, and GLi+1 protrudes and forms a gate electrode 121, and a portion of each of the data lines DL1, DL2, and DL3 protrudes and forms a source electrode 123.

A gate insulating layer 113 is disposed above each of the gate lines GLi−1, GLi, and GLi+1. According to an embodiment, the gate insulating layer 113 may include an inorganic material such as a silicon oxide or a silicon nitride.

A semiconductor layer 122 is disposed over the gate insulating layer 113 and overlaps the gate electrode 121. The semiconductor layer 122 may include a metallic oxide such as amorphous silicon (a-Si) or poly-Si, and oxide semiconductor such as indium gallium zinc oxide (IGZO).

The source electrode 123 and a drain electrode 125 are disposed above the semiconductor layer 122. A first passivation layer 115 covers the source electrode 123 and the drain electrode 125. The first passivation layer 115 may include an inorganic material such as a silicon oxide or a silicon nitride. Alternatively, the first passivation layer 115 may include an organic material having an insulating property such as an acryl resin, a silicon resin, and a polyimide resin, but the embodiment is not limited thereto.

The gate electrode 121, the semiconductor layer 122, the source electrode 123, and the drain electrode 125 form a thin film transistor. Each thin film transistor is electrically connected to a pixel electrode 150 disposed in each of the first, second, third, and fourth pixel areas PA1, PA2, PA3, and PA4. Hereinafter, a thin film transistor electrically connected to the pixel electrode 150 disposed in the first pixel area PA1 is referred to as a first thin film transistor TFT1. Similarly, a thin film transistor electrically connected to the pixel electrode 150 disposed in the second pixel area PA2 is referred to as a second thin film transistor TFT2, a thin film transistor electrically connected to the pixel electrode 150 disposed in the third pixel area PA3 is referred to as a third thin film transistor TFT3, and a thin film transistor electrically connected to the pixel electrode 150 disposed in the fourth pixel area PA4 is referred to as a fourth thin film transistor TFT4.

The first thin film transistor TFT1 may be disposed in the black area BA between the first pixel area PA1 and the second pixel area PA2. A gate electrode 121 of the first thin film transistor TFT1 is connected to the i-th gate line GLi, a source electrode 123 of the first thin film transistor TFT1 is connected to the first data line DL1, and a drain electrode 125 of the first thin film transistor TFT1 is connected to the pixel electrode 150 in the first pixel area PA1 via contact portion CNT disposed in the black area BA.

A gate electrode of the second thin film transistor TFT2 is connected to the (i+1)-th gate line GLi+1 and disposed adjacent to the (i+1)-th gate line GLi+1. For example, the second thin film transistor TFT2 may be disposed spaced apart from the first thin film transistor TFT1 with the pixel electrode 150 of the second pixel area PA2 disposed therebetween. A source electrode of the second thin film transistor TFT2 is connected to the first data line DL1, and a drain electrode of the second thin film transistor TFT2 is connected to the pixel electrode 150 in the second pixel area PA2 via contact portion CNT disposed in a black area BA. The contact portion CNT may be defined by a gap or opening between adjacent color filters, such as the contact portion CNT between the first and second color filters 131A and 132A shown in FIG. 3, or by a hole formed in the third or fourth color filters 133A or 134A shown in FIG. 3.

The third thin film transistor TFT3 is connected to the i-th gate line GLi and may be disposed in the black area BA between the third pixel area PA3 and the fourth pixel area PA4. A gate electrode of the third thin film transistor TFT3 is connected to the i-th gate line GLi, a source electrode of the third thin film transistor TFT3 is connected to the second data line DL2, and a drain electrode of the third thin film transistor TFT3 is connected to the pixel electrode 150 in the third pixel area PA3 via contact portion CNT disposed in the black area BA.

A gate electrode of the fourth thin film transistor TFT4 is connected to an (i−1)-th gate line GLi−1 and disposed adjacent to the (i−1)-th gate line GLi−1. For example, the fourth thin film transistor TFT4 may be disposed spaced apart from the third thin film transistor TFT3 with the pixel electrode 150 of the fourth pixel area PA4 disposed therebetween. A gate electrode of the fourth thin film transistor TFT4 is connected to the (i−1)-th gate line GLi−1, a source electrode of the fourth thin film transistor TFT4 is connected to the second data line DL2, and a drain electrode of the fourth thin film transistor TFT4 is connected to the pixel electrode 150 in the fourth pixel area PA4 via contact portion CNT disposed in the black area BA.

The pixel electrode 150 includes an electrode portion 151 disposed in each of the first, second, third, and fourth pixel areas PA1, PA2, PA3, and PA4, and an extension electrode portion 152 extending from the electrode portion 151 to each of the first, second, third and fourth thin film transistors TFT1, TFT2, TFT3, and TFT4.

The electrode portion 151 may include a cutout pattern. The electrode portion 151 may include a horizontal stem portion 151a, a vertical stem portion 151b crossing the horizontal stem portion 151a, and branch portions 151c, as shown best in FIG. 3. The electrode portion 151 may be divided into four portions by the horizontal stem portion 151a and the vertical stem portion 151b, and each of the four portions may include the branch portions 151c.

The extension electrode portion 152 is integrally formed with the electrode portion 151 and protrudes toward the drain electrode 125. The extension electrode portion 152 is connected with the drain electrode 125 via contact portion CNT.

First, second, third, and fourth color filters 131A, 132A, 133A, and 134A are disposed above the first, second, third, and fourth thin film transistors TFT1, TFT2, TFT3, and TFT4, respectively, with the first passivation layer 115 disposed therebetween. Each of the first, second, third, and fourth color filters 131A, 132A, 133A, and 134A is configured into the shape of an island and is disposed below the pixel electrode 150 located in each of the first, second, third, and fourth pixel areas PA1, PA2, PA3, and PA4 with the second passivation layer 117 disposed between the pixel electrode 150 and one of the color filters 131A, 132A, 133A, and 134A. The second passivation layer 117 may include an inorganic material such as a silicon oxide or a silicon nitride. The second passivation layer 117 may include an organic material having an insulating property such as an acryl resin, a silicon resin, and a polyimide resin, but the embodiment is not limited thereto.

The first, second, third and fourth color filters 131A, 132A, 133A, and 134A may have different colors. The first color filter 131A may have a red color, the second color filter 132A may have a blue color, the third color filter 133A may have a white color, and the fourth color filter 134A may have a green color.

The first, second, third, and fourth color filters 131A, 132A, 133A, and 134A are disposed over the first, second, third and fourth pixel areas PA1, PA2, PA3, and PA4, and may extend to the black area BA. During manufacture of conventional prior devices, if the first, second, third, and fourth color filters 131A, 132A, 133A, and 134A do not extend to the black area BA, deviation in the thickness of the first display substrate 100 may occur. That is, if the first, second, third, and fourth color filters 131A, 132A, 133A, and 134A are not disposed in the black area BA, the thickness of the first display substrate 100 corresponding to the black area BA may be less than the thickness of the first display substrate 100 corresponding to the first, second, third, and fourth pixel areas PA1, PA2, PA3, and PA4. When the thickness of the first display substrate 100 is not substantially constant, a cell gap between the first display substrate 100 and the second display substrate 200 may also not be substantially constant, and thus image quality may deteriorate.

However, according to an exemplary embodiment, since the first, second, third, and fourth color filters 131A, 132A, 133A, and 134A extend to cover not only the first, second, third, and fourth pixel areas PA1, PA2, PA3, and PA4, but also the black area BA, the cell gap between the first display substrate 100 and the second display substrate 200 may be maintained relatively constant.

Each of the first and second color filters 131A and 132A extends to the black area BA between the first and second pixel areas PA1 and PA2. The first and second color filters 131A and 132A contact each other in the black area BA, and are spaced apart from each other in the area near contact portion CNT. The contact portion CNT may be disposed between the first thin film transistor TFT1 and the pixel electrode 150. For example, as illustrated in FIGS. 3 and 4, when seen along sectional line IV-IV' passing through the contact portion CNT, the first and second color filters 131A and 132A are spaced apart from each other by the intervening contact portion CNT.

The color filters may be arranged in a special configuration to facilitate manufacturing and avoid potential disconnection of the extending electrodes. For example, the second color filter 132A may include a recessed or indented portion 132Aa partially surrounding contact portion CNT formed by the sides of surrounding protruding portions 132Ac. While the sides and bottom of indented portion 132Aa are shown for clarity as having straight sides forming a square or rectangular shape with an opening at one side, the actual shape of the sides may vary in practice. For example, the corners may be rounded, and the sides may be curved, such as convex and/or concave in shape. The contact portion CNT may be disposed between the drain electrode 125 of the first thin film transistor TFT1 and the pixel electrode 150. The protruding portions 132Ac that form the indented portion 132Aa of the second color filter 132A may contact the first color filter 131A. The protruding portions 132Ac of the second color filter 132A may partially overlap the first color filter 131A.

The indented portion 132Aa of the second color filter 132A may be disposed on one side of the contact portion CNT to partially surround the contact portion CNT, and the first color filter 131A may be disposed on the other side of the contact portion CNT. The indented portion 132Aa of the second color filter 132A and the first color filter 131A may be disposed spaced apart from each other with the contact portion CNT disposed therebetween, as shown best in FIG. 4. For example, the indented portion 132Aa of the second color filter 132A may receive a first portion 131Ab of the first color filter 131A without contacting each other such that an end of the first portion 131Ab may be spaced apart from the indented portion 132Aa of the second color filter 132A with the contact portion CNT disposed therebetween. For example, as shown in the illustrated embodiment the first portion 131Ab of the first color filter 131A may extend toward and within the indented portion 132Aa of the second color filter 132A.

The extension electrode portion 152 of the pixel electrode 150 connected with the first thin film transistor TFT1 via the contact portion CNT may extend toward the first pixel area PA1, but does not overlap the second color filter 132A. The extension electrode portion 152 may overlap only the first color filter 131A. For example, the extension electrode portion 152 may overlap the first portion 131Ab of the first color filter 131A.

Figure 5A:
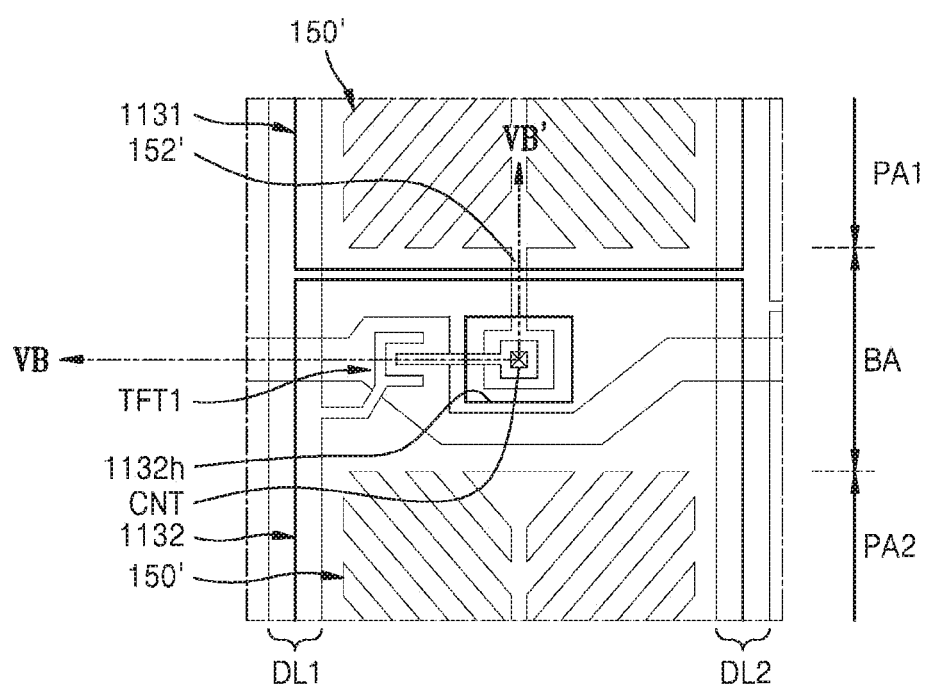
FIG. 5A is an extracted plan view of a portion of a first pixel area and a second pixel area of a liquid crystal display device according to a comparison example showing an example configuration of the contact area between adjacent color filters for comparison to the exemplary embodiments.
Figure 5B:
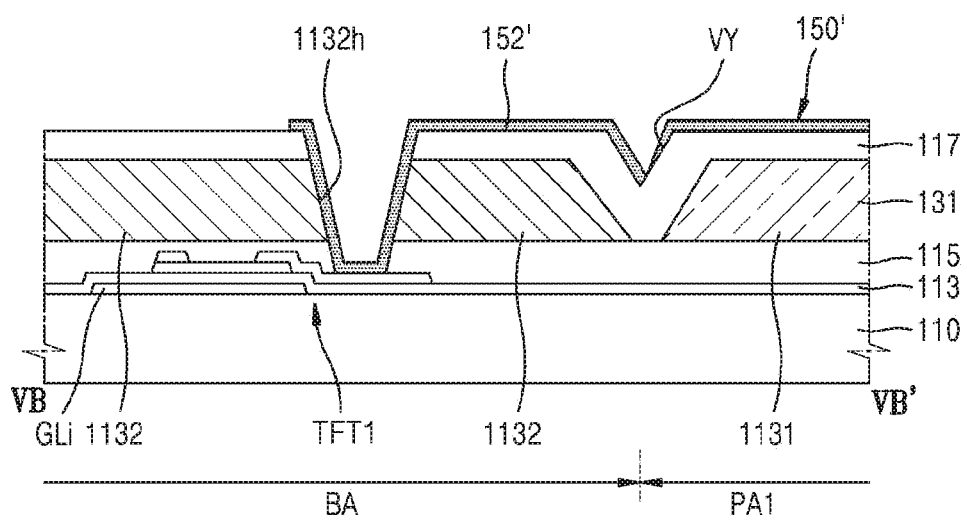
FIG. 5B is a cross-sectional view of the portion of the liquid crystal display device of FIG. 5A taken along sectional line VB-VB' of FIG. 5A.

FIG. 5A is an extracted plan view of a portion of a first pixel area and a second pixel area of a liquid crystal display device showing an example configuration of the contact area between adjacent color filters for comparison to the exemplary embodiment. FIG. 5B is a cross-sectional view of the portion of the liquid crystal display device of FIG. 5A taken along sectional line VB-VB' of FIG. 5A.

Referring to FIGS. 5A and 5B, except for the shape of first and second color filters 1131 and 1132 extending to a black area BA between the first and second pixel areas PA1 and PA2, the configuration of the other elements are substantially the same as those described with reference to FIG. 3. Note that while the second color filter 132A of FIG. 3 includes the indented portion 132Aa partially surrounding the contact portion CNT, the second color filter 1132 of FIG. 5A includes a hole 1132*h* entirely surrounding the contact portion CNT. As shown best in FIG. 5B, the contact portion CNT is surrounded completely by the second color filter 1132 only.

The first color filter 1131 and the second color filter 1132 are designed to partially overlap each other in the black area BA so that a cell gap between the two display substrates is maintained substantially constant. However, in the case where the first and second color filters 1131 and 1132 do not overlap each other due to misalignment, a valley VY is formed between the first and second color filters 1131 and 1132 as illustrated in FIG. 5B. While a pixel electrode 150' disposed above the first and second color filters 1131 and 1132 is formed, a portion of the pixel electrode 150', for example, an extension electrode portion 152' may be easily disconnected in an area including the valley VY.

However, according to an embodiment, such as illustrated in FIGS. 3 and 4, since the second color filter 132A includes the indented portion 132Aa partially surrounding the contact portion CNT, even when misalignment of the first and second color filters 131A and 132A occurs, the valley VY illustrated in FIG. 5 is not formed. Since only the first color filter 131A is located below the pixel electrode 150 in the first pixel area PA1, the extension electrode portion 152 of the pixel electrode 150 extending toward the contact portion CNT is located above a relatively flat surface overlapping the first portion 131Ab. Therefore, disconnection of the extension electrode portion 152 may be prevented.

Referring to FIGS. 3 and 4, the first color filter 131A and the second color filter 132A may have substantially the same shape. The first color filter 131A may include an indented portion 131Aa disposed on an opposite side of the first portion 131Ab and protruding portions 131Ac disposed on both sides of the indented portion 131Aa. The second color filter 132A may include a first portion 132Ab disposed on an opposite side of the indented portion 132Aa.

The third color filter 133A may have a shape different from those of the first and second color filters 131A and 132A.

The third color filter 133A is disposed in the third pixel area PA3 to overlap the pixel electrode 150, and extends to the black area BA to cover the third thin film transistor TFT3. The third color filter 133A includes a hole 133Ah exposing contact portion CNT between the third thin film transistor TFT3 and the pixel electrode 150. Since only the third color filter 133A is disposed below the extension electrode portion 152 of the pixel electrode 150 that corresponds to the third pixel area PA3, the valley VY (see FIG. 5B) is not formed.

The fourth color filter 134A may have substantially the same shape as that of the third color filter 133A. The fourth color filter 134A is disposed in the fourth pixel area PA4 to overlap the pixel electrode 150, and extends to the black area BA to cover the fourth thin film transistor TFT4. The fourth color filter 134A includes a hole 134Ah exposing contact portion CNT between the fourth thin film transistor TFT4 and the pixel electrode 150. Since only the fourth color filter 134A is disposed below the extension electrode portion 152 of the pixel electrode 150 that corresponds to the fourth pixel area PA4, the valley VY (see FIG. 5B) is not formed.

The second display substrate 200 includes a substrate 210 and a common electrode 220 disposed above the substrate 210. The second display substrate 200 includes a black matrix BM disposed corresponding to the black area BA. Though not shown, an alignment layer may be disposed on the first display substrate 100 and the second display substrate 200.

Though FIG. 4 illustrates the case where the black matrix BM and the common electrode 220 are disposed on the second display substrate 200, an embodiment is not limited thereto. The black matrix BM may be disposed on the first display substrate 100 to correspond to the black area BA. The common electrode 220 may be disposed on the first display substrate 100. In the case where the first display substrate 100 includes the common electrode 220, the common electrode 220 may be disposed in a layer between the second passivation layer 117 and the pixel electrode 150, and a passivation layer may be further disposed between the common electrode 220 and the pixel electrode 150.

Figure 6:
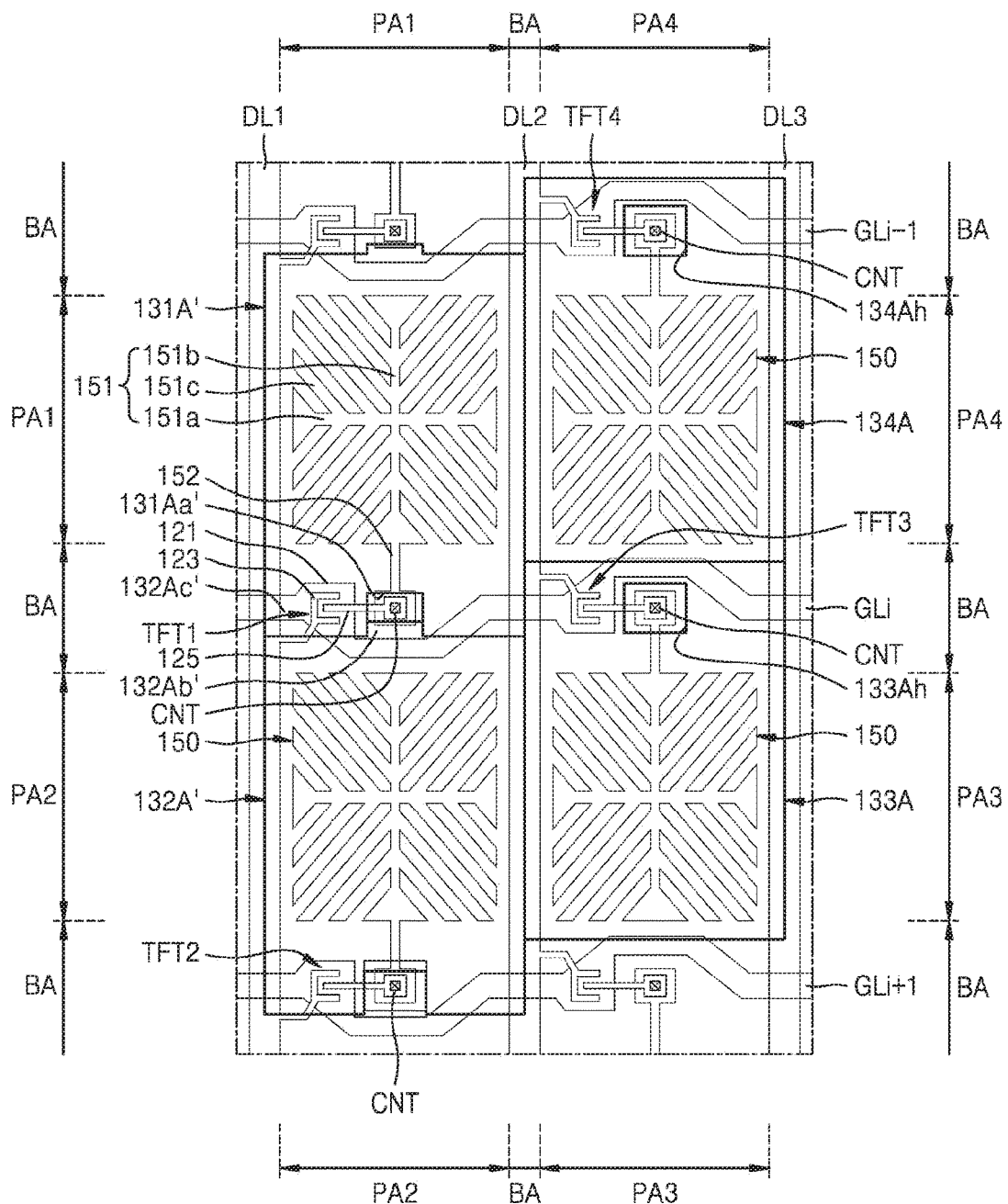
FIG. 6 is a plan view of a liquid crystal display device according to another exemplary embodiment.

FIG. 6 is a plan view of a liquid crystal display device according to another exemplary embodiment.

The liquid crystal display device of FIG. 6 is substantially the same as the liquid crystal display device of FIG. 3 with only difference in the shape of first and second color filters 131A' and 132A'. Therefore, repeated descriptions will be omitted and the difference will be mainly described.

The first color filter 131A' of the liquid crystal display device of FIG. 6 includes an indented portion 131Aa' partially surrounding the contact portion CNT unlike the liquid crystal display device of FIG. 3 in which the second color filter 132A includes the indented portion 132Aa partially surrounding the contact portion CNT.

Referring to FIG. 6, each of the first and second color filters 131A' and 132A' extends to the black area BA between the first and second pixel areas PA1 and PA2. The first and second color filters 131A' and 132A' contact each other in the black area BA and are spaced apart from each other in the area near the contact portion CNT. The contact portion CNT may be disposed between the first thin film transistor TFT1 and the pixel electrode 150.

For example, the first color filter 131A' may include an indented portion 131Aa' partially surrounding contact portion CNT and a protruding portion 131Ac' relatively protruding with respect to the indented portion 131Aa'. The contact portion CNT may be disposed between the drain electrode 125 of the first thin film transistor TFT1 and the pixel electrode 150. The protruding portion 131Ac' of the first color filter 131A' may contact the second color filter 132A'. The protruding portion 131Ac' of the first color filter 131A' may partially overlap the second color filter 132A'.

The indented portion 131Aa' of the first color filter 131A may be disposed on one side of the contact portion CNT to partially surround the contact portion CNT, and the second color filter 132A' may be disposed on the other side of the contact portion CNT. The indented portion 131Aa' of the first color filter 131A' and the second color filter 132A' may be spaced apart from each other in the area near the contact portion CNT. The indented portion 131Aa' of the first color filter 131A' and a first portion 132Ab' of the second color filter 132A' may be disposed spaced apart from each other with the contact portion CNT disposed therebetween. An end of the first portion 132Ab' may be spaced apart from the indented portion 131Aa' of the first color filter 131A'. The first portion 132Ab' of the second color filter 132A' may extend toward the indented portion 131Aa' of the first color filter 131A'.

The extension electrode portion 152 of the pixel electrode 150 connected with the first thin film transistor TFT1 via the contact portion CNT may extend toward the first pixel area PA1. The extension electrode portion 152 may not overlap the second color filter 132A' but overlap only the first color filter 131A' disposed below the extension electrode portion 152.

As described with reference to FIGS. 3 and 6, the first and second color filters 131A and 132A (131A' and 132A') contact each other in the black area BA, and one of the first and second color filters 131A and 132A (131A' and 132A') includes an indented portion 132Aa (131Aa') so that the first and second color filters 131A and 132A (131A' and 132A') are spaced apart from each other in the area near the contact portion CNT. Therefore, a cell gap between the first and second display substrates 100 and 200 may be maintained substantially constant, and disconnection of the pixel electrode 150 may be prevented.

Figure 7:
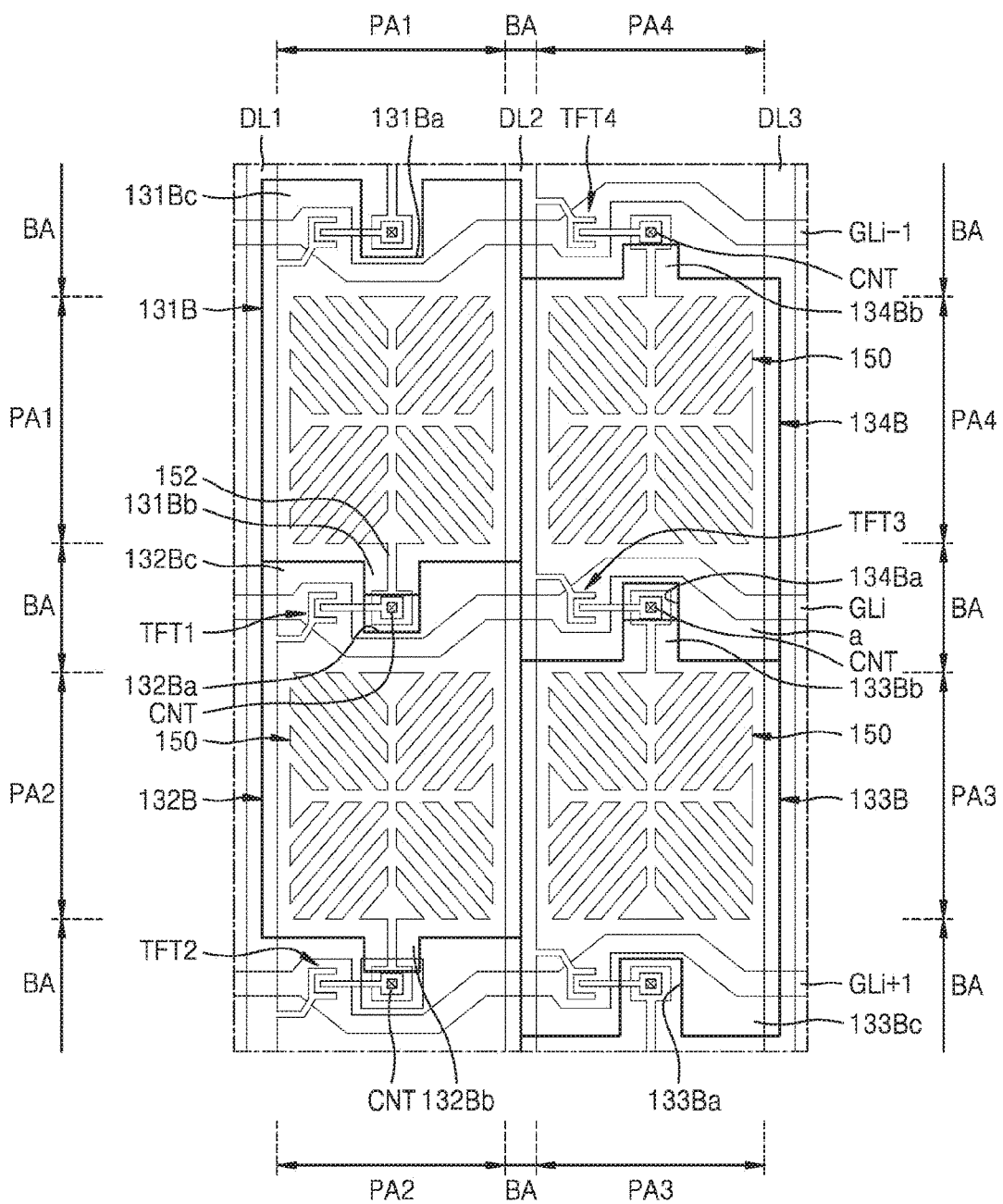
FIG. 7 is a plan view of a liquid crystal display device according to yet another exemplary embodiment.
Figure 8:
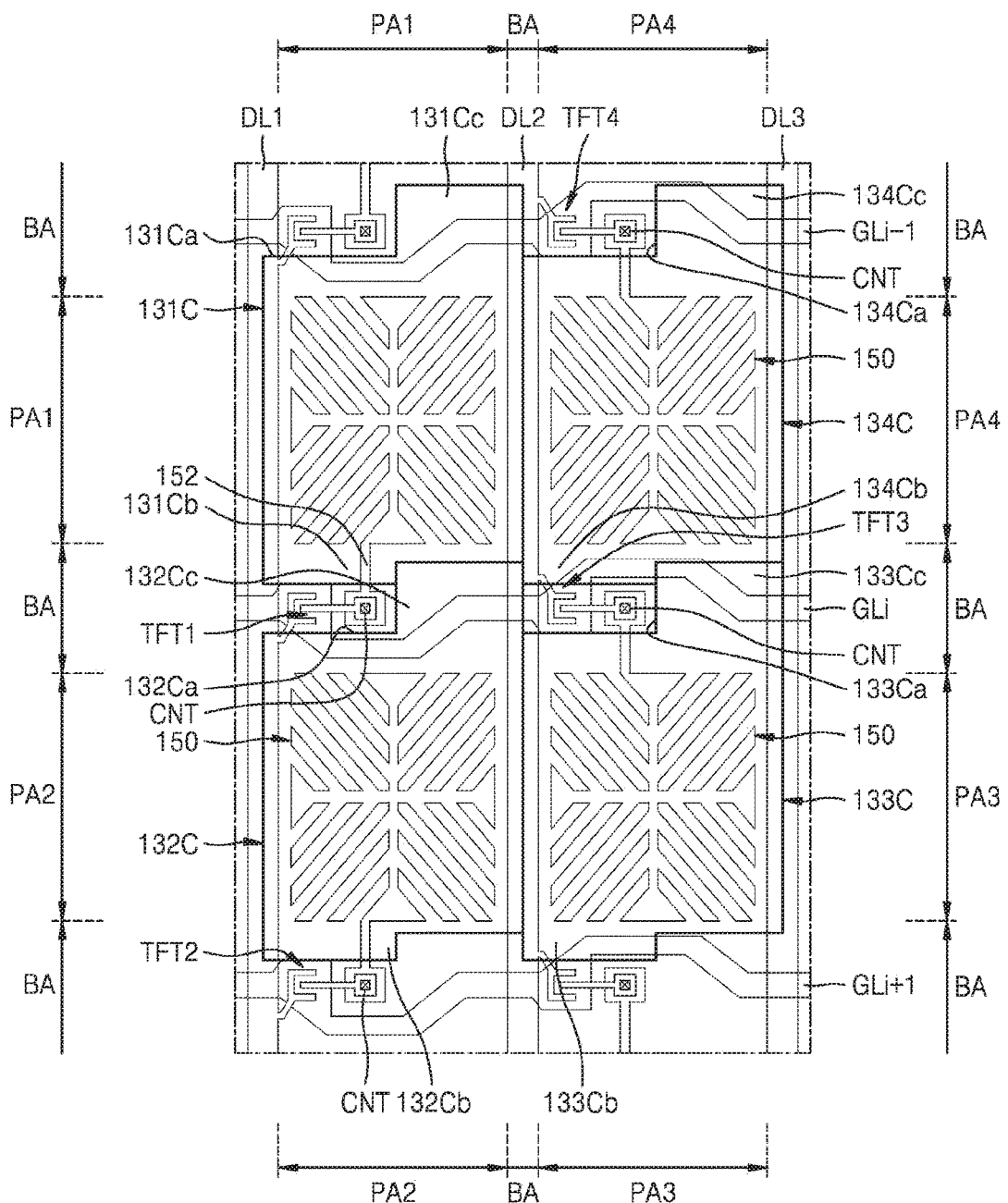
FIG. 8 is a plan view of a liquid crystal display device according to a further exemplary embodiment.

FIG. 7 is a plan view of a liquid crystal display device according to yet another exemplary embodiment. FIG. 8 is a plan view of a liquid crystal display device according to a further exemplary embodiment.

Referring to FIG. 7, the shapes of third and fourth color filters 133B and 134B are different from the shapes of the third and fourth color filters 133A and 134A described with reference to FIG. 3. The shapes of first and second color filters 131B and 132B of FIG. 7 are substantially the same as the shapes of the first and second color filters 131A and 132A described with reference to FIG. 3. For example, like the first and second color filters 131A and 132A of FIG. 3, the first and second color filters 131B and 132B include indented portions 131Ba and 132Ba, first portions 131Bb and 132Bb, and protruding portions 131Bc and 132Bc. Therefore, descriptions of the first and second color filters 131B and 132B will be omitted, and a difference will be mainly described below.

The third and fourth color filters 133B and 134B have substantially the same shapes as those of the first and second color filters 131B and 132B.

The third and fourth color filters 133B and 134B are disposed in the third and fourth pixel areas PA3 and PA4 to overlap the pixel electrodes 150, respectively, and extend to the black area BA between the third and fourth pixel areas PA3 and PA4.

The fourth color filter 134B includes an indented portion 134Ba partially surrounding the contact portion CNT and protruding portions 134Bc disposed on both sides of the indented portion 134Ba. The contact portion CNT may be disposed between the third thin film transistor TFT3 and the pixel electrode 150. The third color filter 133B includes a first portion 133Bb protruding toward the indented portion 134Ba of the fourth color filter 134B. The protruding portion 134Bc of the fourth color filter 134B may contact and overlap the third color filter 133B in the black area BA.

The indented portion 134Ba of the fourth color filter 134B and the first portion 133Bb of the third color filter 133B are spaced apart from each other in the area near the contact portion CNT, and an end of the first portion 133Bb of the third color filter 133B is disposed spaced apart from the fourth color filter 134B.

Since the fourth color filter 134B includes the indented portion 134Ba partially surrounding the contact portion CNT, the third and fourth color filters 133B and 134B do not overlap each other below the extension electrode portion 152. Also, since the first portion 133Bb of the third color filter 133B extends toward the contact portion CNT, and the extension electrode portion 152 overlaps the first portion 133Bb, the extension electrode portion 152 is located above a relatively flat surface. Therefore, disconnection of the extension electrode portion 132 may be prevented.

The fourth color filter 134B has substantially the same shape as that of the third color filter 133B. The fourth color filter 134B may include a first portion 134Bb disposed on an opposite side of the indented portion 134Ba. The third color filter 133B may include an indented portion 133Ba disposed on an opposite side of the first portion 133Bb, and protruding portions 133Bc disposed on both sides of the indented portion 133Ba.

Referring to FIG. 8, the location of the contact portion CNT and the shapes of the first, second, third, and fourth color filters 131C, 132C, 133C, and 134C are different from the shapes of the first, second, third, and fourth color filters 131B, 132B, 133B, and 134B described with reference to FIG. 7.

The contact portion CNT between first, second, third, and fourth thin film transistors TFT1, TFT2, TFT3, and TFT4 and the pixel electrode 150 is disposed close toward the data lines DL1 and DL2, and the first, second, third, and fourth color filters 131C, 132C, 133C, and 134C may have substantially the same shape. The first, second, third, and fourth color filters 131B, 132B, 133B, and 134B illustrated in FIG. 7 include two protruding portions 131Bc, 132Bc, 133Bc, and 134Bc. In contrast, the first, second, third, and fourth color filters 131C, 132C, 133C, and 134C illustrated in FIG. 8 include one protruding portion 131Cc, 132Cc, 133Cc, and 134Cc.

The first and second color filters 131C and 132C, or the third and fourth color filters 133C and 134C illustrated in FIG. 8 contact each other, and one of the color filters includes the indented portion 131Ca, 132Ca, 133Ca, 134Ca partially surrounding the contact portion CNT so that the one of the color filters may not contact the other of the color filters with the contact portion CNT disposed therebetween. The indented portion 131Ca, 132Ca, 133Ca, 134Ca of the one of the color filters is spaced apart from an end of the first portion 131Cb, 132Cb, 133Cb, and 134Cb and thus does not contact the end. Through this configuration, the pixel electrode 150 is configured not to have the valley VY between adjacent color filters, so that disconnection, for example, disconnection of the extension electrode 152 may be prevented as described above.

Figure 9:
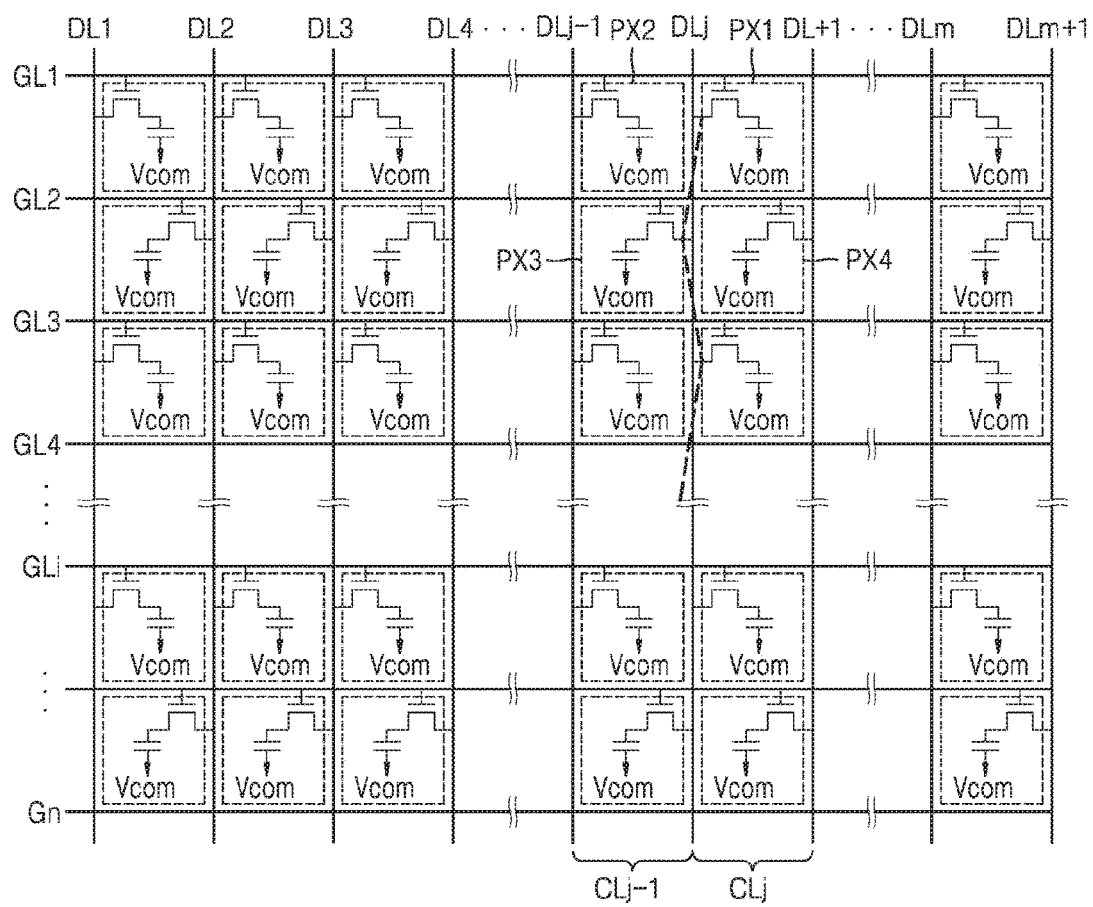
FIG. 9 is a schematic circuit diagram of a display of a liquid crystal display device according to yet another exemplary embodiment.

FIG. 9 is a schematic circuit diagram of a display of a liquid crystal display device according to yet another exemplary embodiment.

Referring to FIG. 9, one data line DLj (j=1, 2, 3, . . . , m+1) may be alternately connected with pixels PX in adjacent two pixel columns CLj−1 and CLj and may provide a data signal. The pixels PX may be alternately disposed right and left around a data line GLj, for example, disposed zigzag.

Some pixels of pixels PX in a j-th pixel column CLj, for example, a first pixel PX1 may be electrically connected to a j-th data line DLj, and the other pixels, for example, a fourth pixel PX4 may be electrically connected to a (j+1)-th data line DLj+1.

Some pixels of pixels PX in a (j−1)-th pixel column CLj−1, for example, a second pixel PX2 may be electrically connected to a (j−1)-th data line DLj−1, and the other pixels, for example, a third pixel PX3 may be electrically connected to the j-th data line DLj.

As illustrated in FIG. 9, a liquid crystal display device in which respective pixels PX connected to the same data line DLj are alternately disposed, that is, disposed zigzag may prevent disconnection of the pixel electrode 150 by a structure of a color filter as described with reference to FIGS. 2, 3, and 4.

Figure 10:
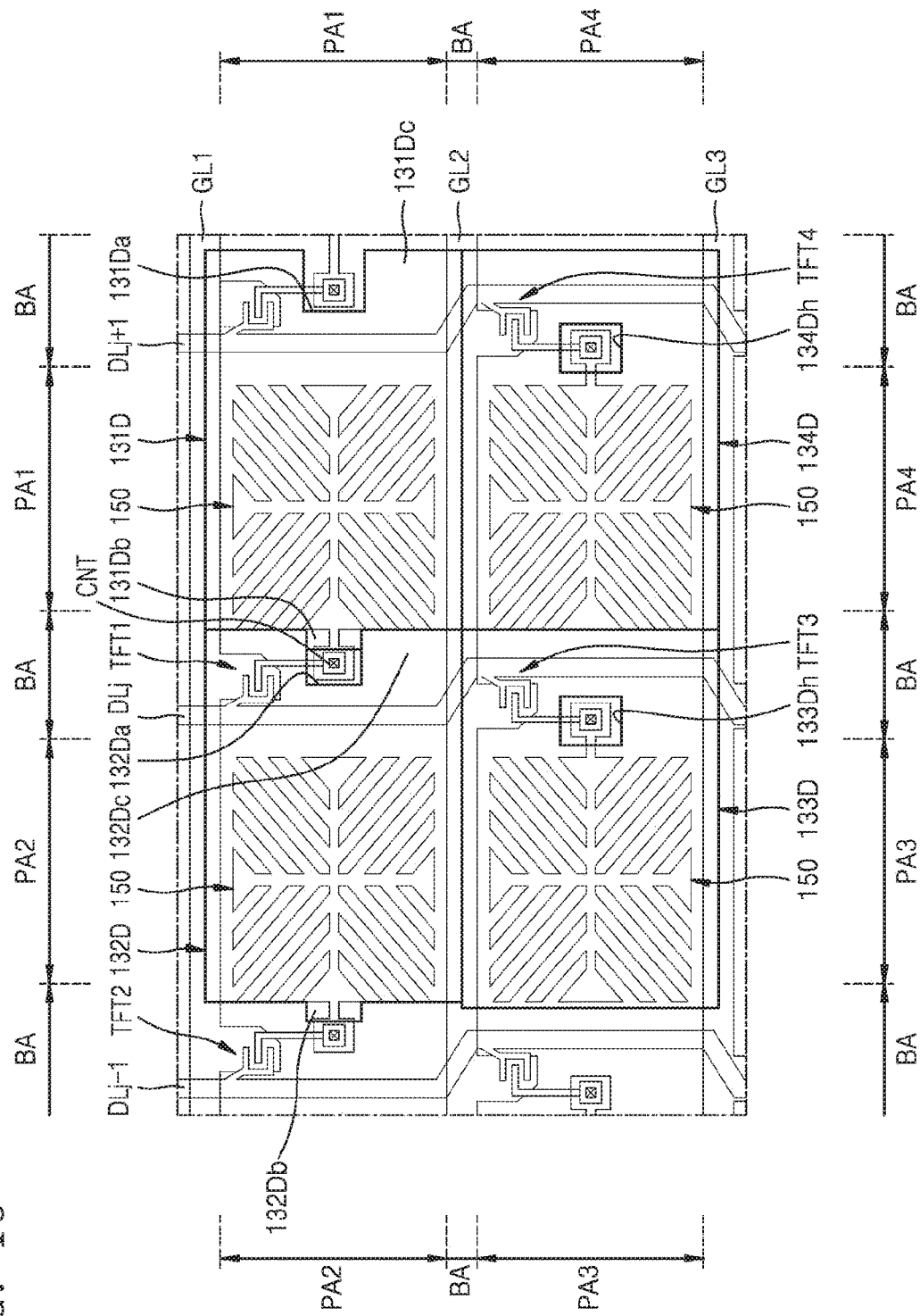
FIG. 10 is an extracted plan view of a first pixel, a second pixel, a third pixel, and a fourth pixel of a liquid crystal display device according to another exemplary embodiment.

FIG. 10 is an extracted plan view of a first pixel, a second pixel, a third pixel, and a fourth pixel of a liquid crystal display device according to another exemplary embodiment.

Referring to FIG. 10, respective gate lines GL1, GL2, and GL3, and respective data lines DLj−1, DLj, and DLj+1 are disposed in the black area BA, and respective pixel electrodes 150 are located in the first, second, third, and fourth pixel areas PA1, PA2, PA3, and PA4, and connected with the first, second, third, and fourth thin film transistors TFT1, TFT2, TFT3, and TFT4 in the contact portion CNT.

The first thin film transistor TFT1 is disposed in the black area BA between the first pixel area PA1 and the second pixel area PA2. The first thin film transistor TFT1 is connected to the first gate line GL1 and the j-th data line DLj.

The second thin film transistor TFT2 is connected to the first gate line GL1 and the (j−1)-th data line DLj−1. The second thin film transistor TFT2 is disposed adjacent to the (j−1)-th data line DLj−1. For example, the second thin film transistor TFT2 is disposed spaced apart from the first thin film transistor TFT1 with the pixel electrode 150 of the second pixel area PA2 disposed therebetween.

The third thin film transistor TFT3 is connected to the second gate line GL2 and the j-th data line DLj. The third thin film transistor TFT3 is disposed in the black area BA between the third pixel area PA3 and the fourth pixel area PA4.

The fourth thin film transistor TFT4 is connected to the second gate line GL2 and the (j+1)-th data line DLj+1. The fourth thin film transistor TFT4 is disposed adjacent to the (j+1)-th data line DLj+1. For example, the fourth thin film transistor TFT4 is disposed spaced apart from the third thin film transistor TFT3 with the pixel electrode 150 of the fourth pixel area PA4 disposed therebetween.

The pixel electrode 150 disposed in each of the first, second, third, and fourth pixel areas PA1, PA2, PA3, and PA4 includes the electrode portion 151 and the extension electrode portion 152 extending from the electrode portion 151 toward each of the first, second, third, and fourth thin film transistors TFT1, TFT2, TFT3, and TFT4.

Each of first, second, third, and fourth color filters 131D, 132D, 133D, and 134D has a shape in the form of an island, and is disposed below the pixel electrode 150 disposed in each of the first, second, third, and fourth pixel areas PA1, PA2, PA3, and PA4.

The first, second, third, and fourth color filters 131D, 132D, 133D, and 134D have different colors. The first color filter 131D may have a red color, the second color filter 132D may have a blue color, the third color filter 133D may have a white color, and the fourth color filter 134D may have a green color. The first, second, third, and fourth color filters 131D, 132D, 133D, and 134D extend to the black area BA.

The first and second color filters 131D and 132D contact each other in the black area BA, and one of the first and second color filters 131D and 132D is spaced apart from the other in the area near the contact portion CNT. The contact portion CNT may be disposed between the first thin film transistor TFT1 and the pixel electrode 150.

The second color filter 132D may include an indented portion 132Da partially surrounding the contact portion CNT and a protruding portion 132Dc relatively protruding with respect to the indented portion 132Da. The contact portion CNT may be disposed between a drain electrode of the first thin film transistor TFT1 and the pixel electrode 150. The protruding portion 132Dc of the second color filter 132D contacts the first color filter 131D. For example, the protruding portion 132Dc of the second color filter 132D may partially overlap the first color filter 131D.

The indented portion 132Da of the second color filter 132D is disposed on one side of the contact portion CNT to partially surround the contact portion CNT, and the first color filter 131D is disposed on the other side of the contact portion CNT. The indented portion 132Da of the second color filter 132D and the first portion 131Db of the first color filter 131D are spaced apart from each other in the area near the contact portion CNT. The indented portion 132Da of the second color filter 132D and the first portion 131Db of the first color filter 131D may be disposed spaced apart from each other with the contact portion CNT disposed therebetween, and an end of the first portion 131Db may be disposed spaced apart from the indented portion 132Da of the second color filter 132D. The first portion 131Db of the first color filter 131D may extend toward the indented portion 132Da.

Through the contact portion CNT, the first thin film transistor TFT1 and the extension electrode portion 152 of the pixel electrode 150 extend toward the first pixel area PA1. The extension electrode portion 152 may not overlap the second color filter 132D. The first portion 131Db of the first color filter 131D disposed to overlap the extension electrode portion 152 is disposed below the extension electrode portion 152. That is, since the valley VY (see FIG. 5) is not formed below the extension electrode portion 152, disconnection of the pixel electrode 150 may be prevented as described above.

The first color filter 131D and the second color filter 132D have substantially the same shape. The first color filter 131D may include an indented portion 131Da disposed on an opposite side of the first portion 131Db, and protruding portions 131Dc disposed on both sides of the indented portion 131Da. The second color filter 132D may include a first portion 132Db disposed on an opposite side of the indented portion 132Da.

The third and fourth color filters 133D and 134D have substantially the same shape as those of the third and fourth color filters 133A and 134A described with reference to FIG. 3. Though the third and fourth color filters 133D and 134D may include holes 133Dh and 134Dh exposing the contact portion CNT as illustrated in FIG. 10, an embodiment is not limited thereto. The third and fourth color filters 133D and 134D may have substantially the same shape as those of the first and second color filters 131D and 132D.

Figure 11:
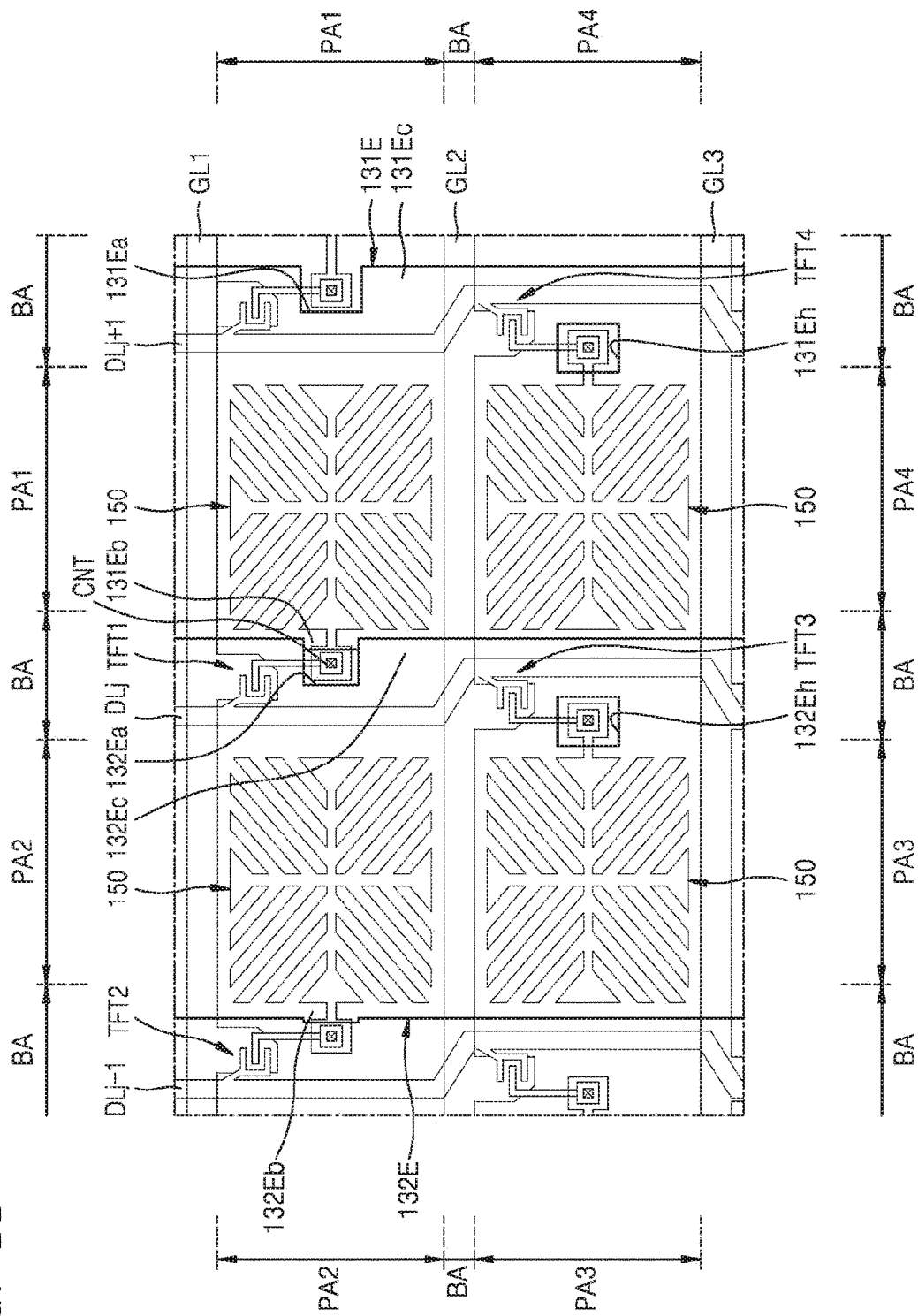
FIG. 11 is an extracted plan view of a first pixel, a second pixel, a third pixel, and a fourth pixel of a liquid crystal display device according to yet another exemplary embodiment.

FIG. 11 is an extracted plan view of a first pixel, a second pixel, a third pixel, and a fourth pixel of a liquid crystal display device according to yet another exemplary embodiment. The first, second, third, and fourth pixel areas PA1, PA2, PA3, and PA4 of FIG. 10 correspond to pixels of different four colors and may have shapes in the form of an island. In contrast, first, second, third, and fourth pixel areas PA1, PA2, PA3, and PA4 of FIG. 11 correspond to pixels of different two colors and have an elongate shape. For convenience of description, differences will be mainly described below.

Referring to FIG. 11, the first and fourth pixel areas PA1 and PA4 correspond to the same color (for example, red), and the second and third pixel areas PA2 and PA3 correspond to the same color (for example, green).

A first color filter 131E may be formed in an elongate shape to correspond to not only the first pixel area PA1 but also the fourth pixel area PA4, and a second color filter 132E may be formed in an elongate shape to correspond to not only the second pixel area PA2 but also the third pixel area PA3. The first and second color filters 131E and 132E extend to the black area BA.

The first and second color filters 131E and 132E contact each other in the black area BA, and are spaced apart from each other in the area near the contact portion CNT. The contact portion CNT may be disposed between the first thin film transistor TFT1 and the pixel electrode 150.

The second color filter 132E may include an indented portion 132Ea partially surrounding the contact portion CNT and a protruding portion 132Ec relatively protruding with respect to the indented portion 132Ea. The contact portion CNT may be disposed between a drain electrode of the first thin film transistor TFT1 and the pixel electrode 150. The protruding portion 132Ec of the second color filter 132E contacts the first color filter 131E. The protruding portion 132Ec of the second color filter 132E may partially overlap the first color filter 131E.

The indented portion 132Ea of the second color filter 132E is disposed on one side of the contact portion CNT to partially surround the contact portion CNT, and the first color filter 131E is disposed on the other side of the contact portion CNT.

The indented portion 132Ea of the second color filter 132E and the first color filter 131E are spaced apart from each other in the area near the contact portion CNT. The indented portion 132Ea of the second color filter 132E and a first portion 131Eb of the first color filter 131E may be disposed spaced apart from each other with the contact portion CNT disposed therebetween. An end of the first portion 131Eb may be disposed spaced apart from the indented portion 132Ea of the second color filter 132E. The first portion 131Eb of the first color filter 131E may extend toward the indented portion 132Ea of the second color filter 132E.

The extension electrode portion 152 of the pixel electrode 150 in the first pixel area PA1 that is connected with the first thin film transistor TFT1 via the contact portion CNT extends toward the first pixel area PA1 while not overlapping the second color filter 132E. Only the first portion 131Eb of the first color filter 131E is disposed below the extension electrode portion 152, and the extension electrode portion 152 overlaps only the first color filter 131E.

Since the valley YV (see FIG. 5) is not formed below the extension electrode portion 152, disconnection of the extension electrode portion 152 may be prevented as described above.

The first and second color filters 131E and 132E may include holes 131Eh and 132Eh exposing the contact portion CNT between the third and fourth thin film transistors TFT3 and TFT4 and the pixel electrode 150.

Figure 12:
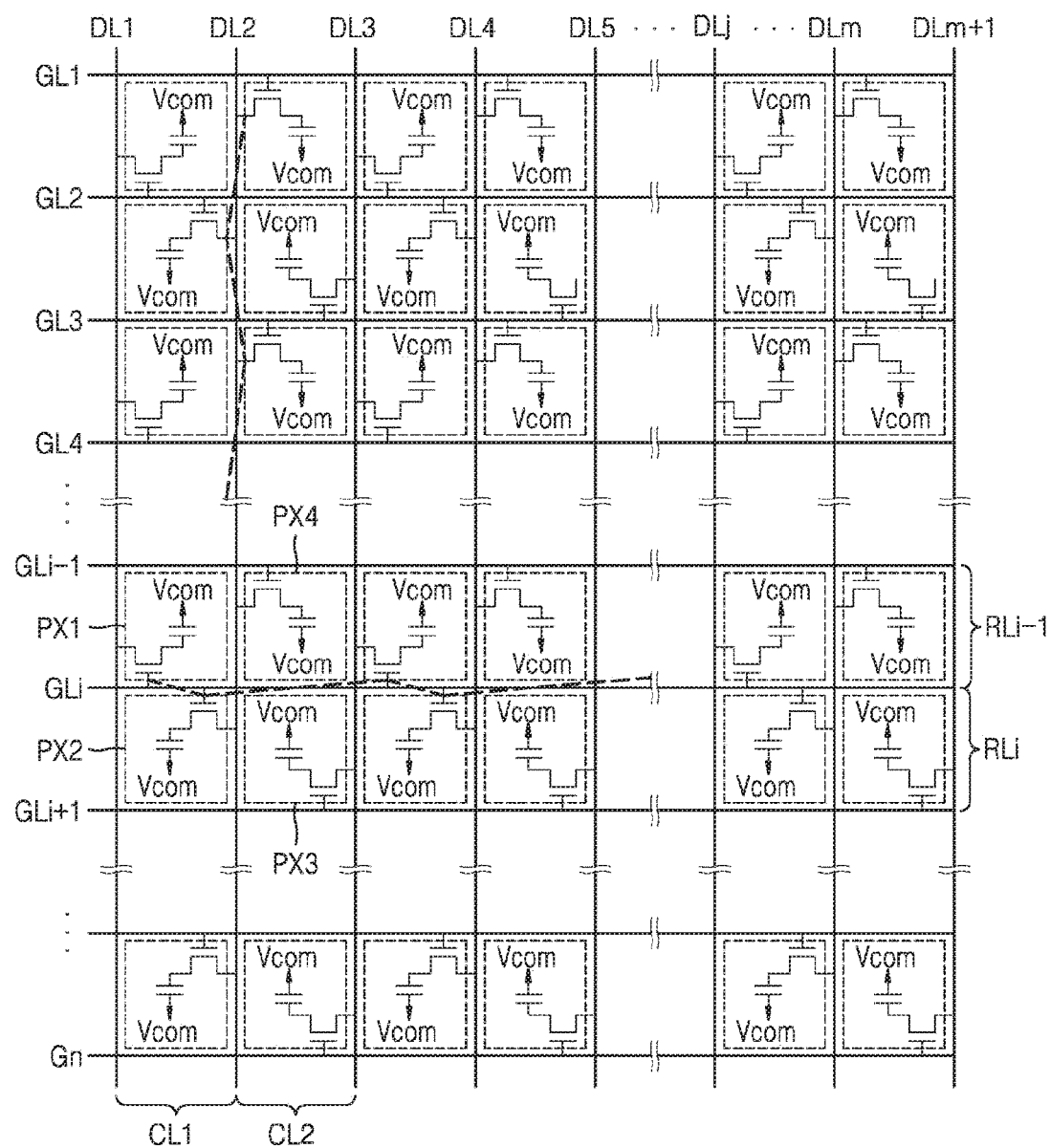
FIG. 12 is a schematic circuit diagram of a display of a liquid crystal display device according to another exemplary embodiment.

FIG. 12 is a schematic circuit diagram of a display of a liquid crystal display device according to another exemplary embodiment.

FIG. 12 illustrates a structure in which pixels PX connected to the same gate line GLi (i=1, 2, 3, . . . , n) are alternately disposed up and down with respect to the relevant gate line GLi, and pixels PX connected to the same data line DLj (j=1, 2, 3, . . . , m+1) are alternately disposed left and right with respect to the relevant data line DLj.

Referring to FIG. 12, some pixels of pixels in an (i−1)-th pixel row RLi−1, for example, a first pixel PX1 may be electrically connected to an i-th gate line GLi, and the other pixels, for example, a fourth pixel PX4 may be electrically connected to an (i−1)-th gate line GLi−1. Some pixels of pixels in an i-th pixel row RLi, for example, a second pixel PX2 may be electrically connected to the i-th gate line GLi, and the other pixels, for example, a third pixel PX3 may be electrically connected to an (i+1)-th gate line GLi+1.

Some pixels of pixels in a first pixel column CL1, for example, a first pixel PX1 may be electrically connected to a first data line DL1, and the other pixels, for example, a second pixel PX2 may be electrically connected to a second data line DL2. Some pixels of pixels in a second pixel column CL2, for example, a third pixel PX3 may be electrically connected to a third data line DL3, and the other pixels, for example, a fourth pixel PX4 may be electrically connected to the second data line DL2.

As illustrated in FIG. 12, even the case where respective pixels PX connected to the same gate line GLi and the same data line DLj are alternately disposed may prevent disconnection of a pixel electrode as described with reference to FIGS. 2, 3, and 4.

Figure 13:
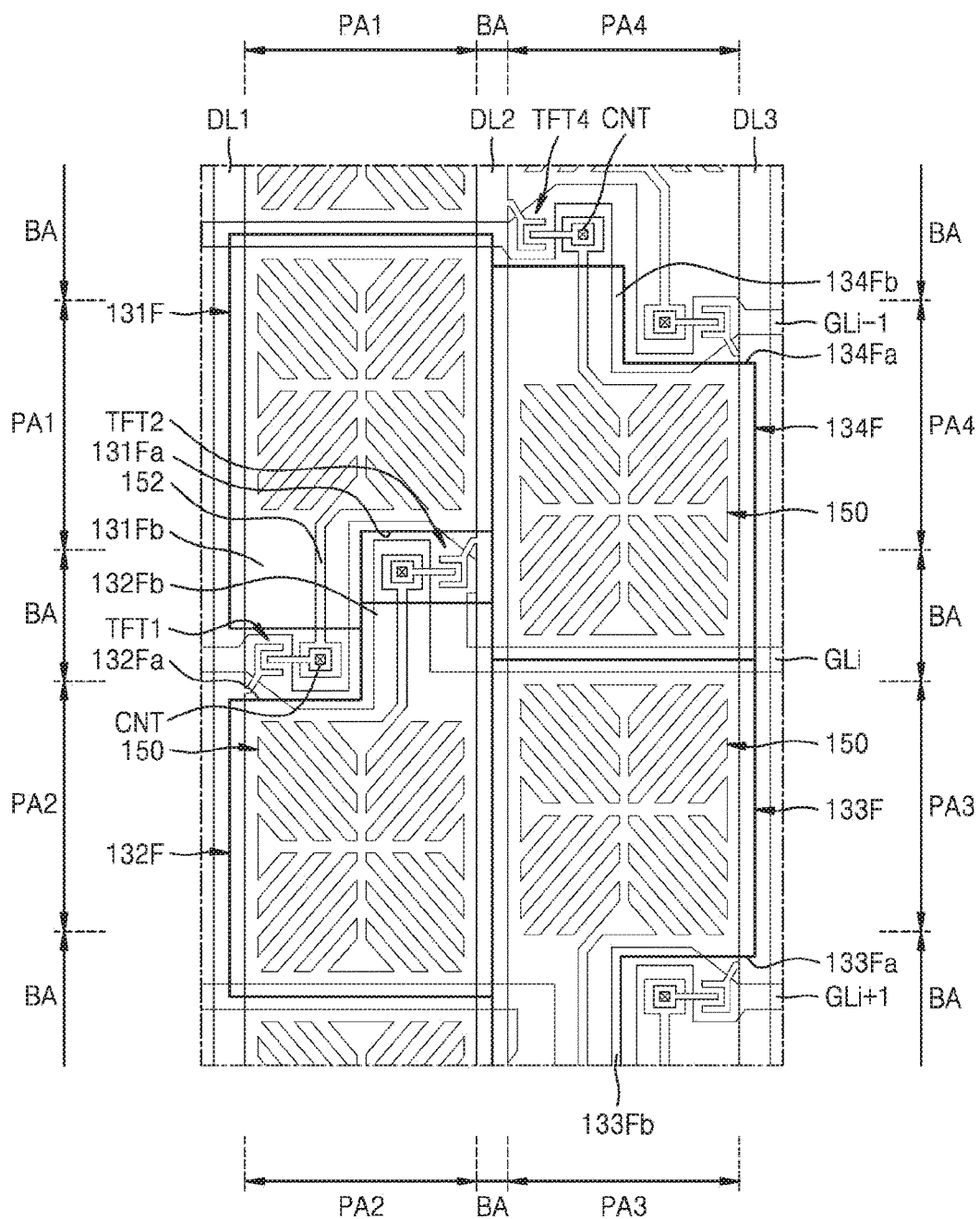
FIG. 13 is an extracted plan view of a first pixel, a second pixel, a third pixel, and a fourth pixel of a liquid crystal display device according to a further exemplary embodiment.

FIG. 13 is an extracted plan view of a first pixel, a second pixel, a third pixel, and a fourth pixel of a liquid crystal display device according to a further exemplary embodiment.

Referring to FIG. 13, respective gate lines GLi−1, GLi, and GLi+1, and respective data lines DL1, D2, and DL3 are disposed in the black area BA, and respective pixel electrodes 150 are disposed in the first, second, third, and fourth pixel areas PA1, PA2, PA3, and PA4, and connected with the first, second, third, and fourth thin film transistors TFT1, TFT2, TFT3, and TFT4 in the contact portion CNT.

The first thin film transistor TFT1 is connected to the i-th gate line GLi and the first data line DL1, and the second thin film transistor TFT2 is connected to the i-th gate line GLi and the second data line DL2. The first and second thin film transistors TFT1 and TFT2 share the gate line GLi, and are disposed adjacent to each other. The first and second thin film transistors TFT1 and TFT2 may be disposed in the black area BA between the first pixel area PA1 and the second pixel area PA2.

The third thin film transistor TFT3 is connected to the (i+1)-th gate line GLi+1 and the third data line DL3 and the fourth thin film transistor TFT4 is connected to the (i−1)-th gate line GLi−1 and the second data line DL2. The third and fourth thin film transistors TFT3 and TFT4 are disposed spaced apart from each other with the pixel electrodes 150 of the third and fourth pixel areas PA3 and PA4 disposed therebetween.

The pixel electrode 150 disposed in each of the first, second, third, and fourth pixel areas PA1, PA2, PA3, and PA4 includes the extension electrode portion 152 extending toward each of the first, second, third, and fourth thin film transistors TFT1, TFT2, TFT3, and TFT4.

First, second, third, and fourth color filters 131F, 132F, 133F, and 134F may have shapes in the form of an island and are disposed below the pixel electrodes 150 respectively located in the first, second, third, and fourth pixel areas PA1, PA2, PA3, and PA4. The first, second, third, and fourth color filters 131F, 132F, 133F, and 134F may have different colors, and may extend toward the black area BA.

The first and second color filters 131F and 132F contact each other in the black area BA, and are spaced apart from each other in the area near the contact portion CNT. The contact portion CNT may be disposed between the first thin film transistor TFT1 and the pixel electrode 150.

The second color filter 132F may include an indented portion 132Fa partially surrounding the contact portion CNT and a first portion 132Fb, which is a protruding portion relatively protruding with respect to the indented portion 132Fa. The contact portion CNT may be disposed between the first thin film transistor TFT1 and the pixel electrode 150.

The indented portion 132Fa of the second color filter 132F and the first color filter 131F, for example, a first portion 131Fb of the first color filter 131F are disposed spaced apart from each other with the contact portion CNT disposed therebetween. The extension electrode portion 152 connected with the first thin film transistor TFT1 via the contact portion CNT extends toward the first pixel area PA1 while not overlapping the second color filter 132F. Since only the first portion 131Fb of the first color filter 131F disposed to overlap the extension electrode portion 152 is disposed below the extension electrode portion 152 and the valley VY (see FIG. 5) is not formed, disconnection of the extension electrode portion 152 may be prevented.

The first portion 132Fb, which is a protruding portion of the second color filter 132F, may contact the first color filter 132F in the black area BA.

The first and second color filters 131F and 132F have substantially the same shape.

The first color filter 131F may include an indented portion 131Fa partially surrounding the contact portion CNT between the second thin film transistor TFT2 and the pixel electrode 150, and the second color filter 132F may include the first portion 132Fb protruding toward the indented portion 131Fa of the first color filter 131F.

The indented portion 131Fa of the first color filter 131F and the first portion 132Fb of the second color filter 132F are spaced apart from each other in the area near the contact portion CNT. The extension electrode portion 152 connected with the second thin film transistor TFT2 via the contact portion CNT extends toward the second pixel area PA2 while not overlapping the first color filter 131F. Since only the protruding portion 132Fb of the second color filter 132F is disposed below the extension electrode portion 152 and the valley VY (see FIG. 5) is not formed, disconnection of the extension electrode portion 152 may be prevented.

The third and fourth color filters 133F and 134F have substantially the same shapes as those of the first and second color filters 131F and 132F. The third and fourth color filters 133F and 134F may include indented portions 133Fa and 134Fa and first portions 133Fb and 134Fb, respectively, and thus disconnection of the extension extrude portion 152 of the pixel electrode 150 may be prevented as described above.

Though the inventive concept has been described with reference to embodiments illustrated in the drawings, these are provided for an exemplary purpose only, and one of ordinary skill in the art will understand that various modifications and other equivalent embodiments may be made therein. Therefore, the spirit and scope of the inventive concept should be defined solely by the appended claims.

What is claimed is:

1. A liquid crystal display device, comprising:
    a first display substrate comprising a gate line and a data line;
    a second display substrate facing the first display substrate; and
    a liquid crystal layer disposed between the first display substrate and the second display substrate,
    wherein the first display substrate further comprises:
        a first pixel electrode and a second pixel electrode respectively corresponding to a first pixel area and a second pixel area, the first pixel electrode and the second pixel electrode being disposed adjacent to each other with one of the gate line and the data line disposed therebetween;
        a first color filter and a second color filter respectively disposed below and overlapping the first pixel electrode and the second pixel electrode, respectively;
        a first thin film transistor electrically connected to the first pixel electrode;
        a second thin film transistor connected to the second pixel electrode; and
        a contact portion connecting the first thin film transistor to the first pixel electrode,
    wherein the first color filter and the second color filter have different colors and contact each other, and one of the first color filter and the second color filter comprises an indented portion partially surrounding the contact portion,
    wherein a portion of the one of the first color filter and the second color filter is spaced apart from a portion of the other of the first color filter and the second color filter with the contact portion disposed therebetween.

2. The liquid crystal display device of claim 1, wherein the one of the first color filter and the second color filter comprises a protruding portion adjacent to the indented portion and extending toward the other of the first color filter and the second color filter.

3. The liquid crystal display device of claim 2, wherein an end of the protruding portion contacts the other of the first color filter and the second color filter.

4. The liquid crystal display device of claim 1, wherein the other of the first color filter and the second color filter comprises a first portion spaced apart from the indented portion with the contact portion disposed therebetween.

5. The liquid crystal display device of claim 4, wherein the first portion extends toward the indented portion from an end of the other of the first color filter and the second color filter.

6. The liquid crystal display device of claim 1, wherein the first pixel electrode comprises:
    an electrode portion corresponding to the first pixel area; and
    an extension electrode portion extending toward the contact portion from the electrode portion and overlapping the first color filter.

7. The liquid crystal display device of claim 6, wherein the electrode portion comprises a cutout pattern.

8. The liquid crystal display device of claim 1, wherein the contact portion is disposed in a black area between the first pixel area and the second pixel area.

9. The liquid crystal display device of claim 8, wherein the second display substrate comprises a black matrix corresponding to the black area.

10. The liquid crystal display device of claim 1, wherein the first color filter and the second color filter have shapes in the form of an island, corresponding to the first pixel region and the second pixel region, respectively.

11. The liquid crystal display device of claim 1, wherein each of the first color filter and the second color filter has an elongate shape extending along a direction of the one of the gate line and the data line.

12. The liquid crystal display device of claim 1, wherein the first color filter and the second color filter have substantially the same shape.

13. The liquid crystal display device of claim 1, wherein the first display substrate further comprises:
  a third pixel electrode disposed adjacent to the second pixel electrode along a direction of the one of the gate line and the data line and disposed spaced apart from the first pixel electrode with the one of the gate line and the data line disposed therebetween; and
  a thin film transistor electrically connected to the third pixel electrode.

14. The liquid crystal display device of claim 13 wherein the first thin film transistor and the thin film transistor are electrically connected to the one of the gate line and the data line.

15. The liquid crystal display device of claim 14, wherein:
  the second thin film transistor is electrically connected to a first line, which is disposed parallel to the one of the gate line and the data line and disposed spaced apart from the one of the gate line and the data line with the second pixel area disposed therebetween.

16. The liquid crystal display device of claim 13, wherein the thin film transistor is electrically connected to a first line, which is disposed parallel to the one of the gate line and the data line and disposed spaced apart from the one of the gate line and the data line with the third pixel electrode disposed therebetween.

17. The liquid crystal display device of claim 16, wherein the second thin film transistor is electrically connected to the one of the gate line and the data line.

18. The liquid crystal display device of claim 1, wherein the first display substrate further comprises a first passivation layer covering the first thin film transistor, and the first color filter and the second color filter are disposed above the first passivation layer.

19. The liquid crystal display device of claim 18, wherein the first display substrate further comprises a second passivation layer covering the first color filter and the second color filter, and the first pixel electrode and the second pixel electrode are disposed above the second passivation layer.

20. A liquid crystal display device, comprising:
  a first display substrate comprising a gate line and a data line;
  a second display substrate facing the first display substrate; and
  a liquid crystal layer disposed between the first display substrate and the second display substrate,
  wherein the first display substrate further comprises:
    a first pixel electrode and a second pixel electrode respectively corresponding to a first pixel area and a second pixel area, the first pixel electrode and the second pixel electrode being disposed adjacent to each other with one of the gate line and the data line disposed therebetween;
    a first color filter and a second color filter respectively disposed below and overlapping the first pixel electrode and the second pixel electrode, respectively;
    a first thin film transistor electrically connected to the first pixel electrode; and
    a contact portion connecting the first thin film transistor to the first pixel electrode,
  wherein the first color filter and the second color filter contact each other, and one of the first color filter and the second color filter comprises an indented portion partially surrounding the contact portion,
  wherein a portion of the one of the first color filter and the second color filter is spaced apart from a portion of the other of the first color filter and the second color filter with the contact portion disposed therebetween, and
  wherein the other of the first color filter and the second color filter comprises a first portion spaced apart from the indented portion with the contact portion disposed therebetween.

* * * * *